US009886621B2

(12) United States Patent
Gordon et al.

(10) Patent No.: US 9,886,621 B2
(45) Date of Patent: Feb. 6, 2018

(54) SEGMENTING SCENES INTO SEMATIC COMPONENTS USING NEUROLOGICAL READINGS

(71) Applicant: MICROSOFT TECHNOLOGY LICENSING, LLC, Redmond, WA (US)

(72) Inventors: John C. Gordon, Newcastle, WA (US); Cem Keskin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 15/151,850

(22) Filed: May 11, 2016

(65) Prior Publication Data

US 2017/0330023 A1 Nov. 16, 2017

(51) Int. Cl.
*G06K 9/00* (2006.01)
*G06F 3/01* (2006.01)
*G06T 7/00* (2017.01)
*G06T 19/00* (2011.01)

(52) U.S. Cl.
CPC ......... *G06K 9/00201* (2013.01); *G06F 3/013* (2013.01); *G06F 3/015* (2013.01); *G06K 9/00671* (2013.01); *G06T 7/0051* (2013.01); *G06T 7/0083* (2013.01); *G06T 19/006* (2013.01); *G06T 2207/20081* (2013.01)

(58) Field of Classification Search
USPC ....................................................... 382/103
See application file for complete search history.

(56) References Cited

U.S. PATENT DOCUMENTS

| 8,165,407 | B1 | 4/2012 | Khosla et al. |
| 8,306,265 | B2 | 11/2012 | Fry et al. |
| 8,699,767 | B1 | 4/2014 | Khosla et al. |
| 2014/0354532 | A1* | 12/2014 | Mullins ................. G06F 3/015 345/156 |
| 2015/0041642 | A1 | 2/2015 | Okumura et al. |
| 2016/0015307 | A1* | 1/2016 | Kothuri ................. A61B 5/167 702/19 |

FOREIGN PATENT DOCUMENTS

| JP | 2011086125 A | 4/2011 |
| WO | 2015041642 A1 | 3/2015 |

OTHER PUBLICATIONS

Rui, et al., "Segmenting Visual Actions Based on Spatio-Temporal Motion Patterns", In Proceedings of IEEE Conference on Computer Vision and Pattern Recognition, vol. 1, Jun. 13, 2000, 8 pages.*

(Continued)

*Primary Examiner* — Gregory F Cunningham
(74) *Attorney, Agent, or Firm* — Workman Nydegger

(57) ABSTRACT

Computer vision systems for segmenting scenes into semantic components identify a differential within the physiological readings from the user. The differential corresponds to a semantic boundary associated with the user's gaze. Based upon data gathered by a gaze tracking device, the computer vision system identifies a relative location of the user's gaze at the time of the identified differential. The computer vision system then associates the relative location of the user's gaze with a semantic boundary.

20 Claims, 8 Drawing Sheets

(56) References Cited

OTHER PUBLICATIONS

Martinovic, et al., "Time Course of Information Processing in Visual and Haptic Object Classification", In Journal of Frontiers in Human Neuroscience, vol. 6, No. 49, Mar. 23, 2012, 13 pages.*
Mathieu, et al., "Interactive Multiclass Segmentation using Superpixel Classification", In Journal of Computing Research Repository, Oct. 2015, pp. 1-15.*
Samadi Mohammad Reza Haji et al: "EEG signal processing for eye tracking", 2014 22nd European Signal Processing Conference (EUSIPCO), EURASIP, Sep. 1, 2014, pp. 2030-2034, XP032682059, [retrieved on Nov. 11, 2014]the whole document.
Suvarsha Prajna et al: "A simple approach to detect eye movements", International Conference for Convergence for Technology-2014, IEEE, Apr. 6, 2014, pp. 1-3, XPO32766059, DOI: 10.1109/I2CT.2014.7092135 [retrieved on Apr. 22, 2015] the whole document.
Kapoor, et al., "Combining Brain Computer Interfaces with Vision for Object Categorization", In Proceedings of IEEE Conference on Computer Vision and Pattern Recognition, Jun. 24, 2008, pp. 1-8.
Nikolaev, et al., "Eye Movement Segmentation of EEG Activity Related to Memory Encoding", In Proceedings of 20th Annual Meeting of the Organization for Human Brain Mapping, Jun. 8, 2014, 1 page.
Scholte, et al., Feedforward and Recurrent Processing in Scene Segmentation: Electroencephalography and Functional Magnetic Resonance Imaging, In Journal of Cognitive Neuroscience, vol. 20, No. 11, Nov. 2008, 1 page.
Kaneshiro, et al., "A Representational Similarity Analysis of the Dynamics of Object Processing Using Single-Trial EEG Classification", In Journal of PLoS One, Aug. 21, 2015, 17 pages.
Kang, et al., "Automatic Image Segmentation Using Saliency Detection and Superpixel Graph Cuts", In Proceedings of International Conference on Robot Intelligence and Technology Application, Dec. 16, 2012, 3 pages.
Simanova, et al., "Identifying Object Categories from Event-Related EEG: Toward Decoding of Conceptual Representations", In Journal of PLoS One, vol. 5, No. 12, Dec. 30, 2010, 11 pages.
"International Search Report and Written Opinion Issued in PCT Application No. PCT/US17/031176", dated Jul. 18, 2017, 13 Pages.
Samadi, et al., "EEG Signal Processing for Eye Tracking", In Proceedings of the 22nd European Signal Processing Conference, Sep. 1, 2014, pp. 2030-2034.
Suvarsha, et al., "A Simple Approach to Detect Eye Movement", In Proceedings of International Conference for Convergence of Technology, Apr. 6, 2014, 3 Pages.

* cited by examiner

SEGMENTING SCENES INTO SEMATIC COMPONENTS USING NEUROLOGICAL READINGS

BACKGROUND

As processes and machines have become more automated, computer vision systems have gained greater importance and interest, both within industrial and consumer spaces. For example, a vegetable factory may utilize a computer vision system to monitor and control the quality of vegetables along an assembly line. Similarly, a robot or autonomous vehicle may utilize a computer vision system to assist in navigating from place-to-place.

As computer vision systems and the supporting computer technology have advanced, the ability to intelligently identify objects within the real-world has become a topic of high interest. In order to identify an object within the real-world, a computer vision system must distinguish objects within an image from each other. For instance, a computer vision system may be tasked with the problem of distinguishing a chair from the background image of the room that contains the chair. Additionally, beyond simply identifying an object within an image, it would provide significant benefits to identify the actual type of object. For example, it is desirable that a computer vision system identify that the object in the image is a chair.

In addition to various other industrial and consumer uses of computer vision systems, recently computer vision systems have been incorporated into virtual reality and augmented reality systems. Computer vision systems can be used to overlay information in a user's field-of-view within an augmented reality system. For instance, it may be desirable for an augmented reality system to automatically display information about an object that the user is focusing on. Various computer systems, however, including virtual reality and augmented reality systems, have difficulty determining the actual object that a user is focusing on. It is difficult to determine, for example, whether the user is focusing on another person, the person's head, the person's face, or the person's nose. Each of these potential focus points can dramatically impact what information the augmented reality system would normally display. Accordingly, there is an ongoing need for improved computer vision systems that are capable of identifying a particular object that a user is focusing on within a scene.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein comprise systems, methods, and apparatus configured to segment scenes into semantic segments. In particular, implementations of the present invention comprise a biometric device for measuring physiological readings from a user and a gaze tracking device for tracking a user's gaze. A computer vision system can analyze the physiological readings and the user's gaze to determine when the user's gaze focuses on a semantic boundary. The computer vision system can then identify semantic segments based upon a collection of semantic boundaries that are identified within a particular scene.

Disclosed embodiments include a computer vision system for segmenting scenes into semantic components. The computer vision system comprises a processing unit in communication with the biometric tracking device that is configured to gather physiological readings from the user and a gaze tracking device that is configured to track a user's gaze. The computer vision system identifies a differential within the physiological readings from the user. The differential corresponds to a semantic boundary associated with the user's gaze. Based upon data gathered by the gaze tracking device, the computer vision system identifies a relative location of the user's gaze at the time of the identified differential. The computer vision system then associates the relative location of the user's gaze with a semantic boundary.

Disclosed embodiments also include another or an additional computer vision system for defining semantic relationships between segments within a scene. The computer vision system comprises one or more processors and one or more computer-readable media having stored thereon executable instructions. When executed, the executable instructions cause the computer vision system to perform various actions.

For example, the computer vision system identifies a plurality of segments within a first digitally captured scene. The computer vision system also creates a relatedness data structure that defines relatedness between different segments within the digitally captured scene. The segments are at least partially defined by one or more boundaries. Additionally, the computer vision system identifies a plurality of semantic boundaries between the plurality of segments in the first digitally captured scene—each of the semantic boundaries segmenting at least two adjacent segments. The computer vision system identifies each of the semantic boundaries based upon a differential within physiological readings from a user while the user is gazing at one of the one or more boundaries. The computer vision system then determines a probability of relatedness between the adjacent segments based upon a relationship between the semantic boundaries segmenting the adjacent segments and other semantic boundaries that surround the adjacent segments. The computer vision system then creates a semantic relationship entry within the relatedness data structure that describes the probability of relatedness between the adjacent segments.

Additional disclosed embodiments also include a computer-implemented method for segmenting scenes into semantic components with a computer vision system. The method includes an act of identifying a differential within detected physiological readings from a user. The detected physiological readings are obtained from a biometric tracking device. The differential corresponds to a semantic boundary associated with a user's gaze that is detected from a gaze tracking device. The method also includes an act of identifying, based upon data gathered by the gaze tracking device, a relative location of the user's gaze at a time of the identified differential. The method further includes an act of associating the relative location of the user's gaze with the semantic boundary.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a schematic of an embodiment of an object that a user is focusing on.

DETAILED DESCRIPTION

Figure 1:
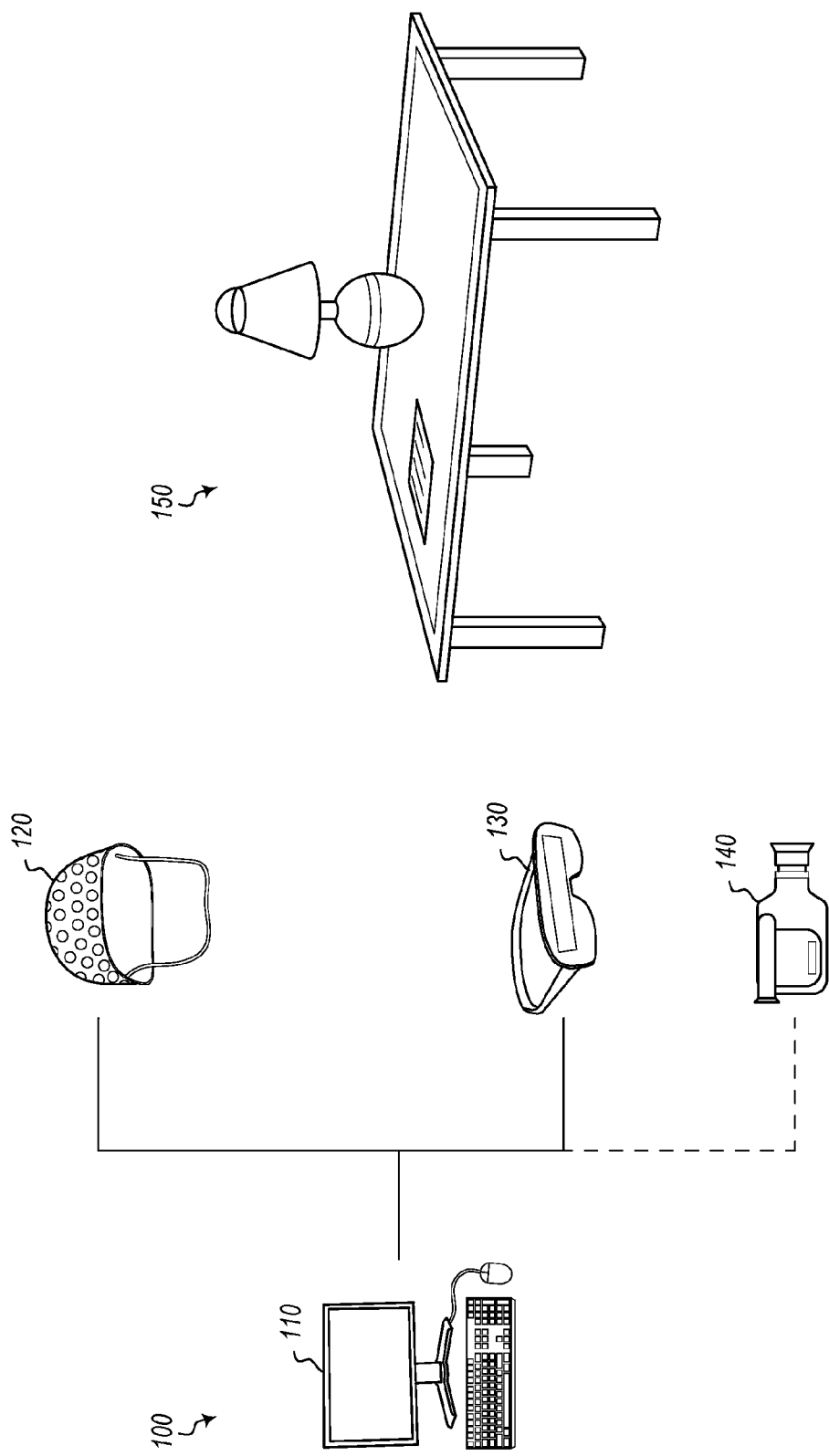
FIG. 1 illustrates a schematic of an embodiment of various computer vision components within a computer vision system.

The present invention extends to systems, methods, and apparatus configured to segment scenes into semantic segments. In particular, implementations of the present invention comprise a biometric device for measuring physiological readings from a user and a gaze tracking device for tracking a user's gaze. A computer vision system can analyze the physiological readings and the user's gaze to determine when the user's gaze focuses on a semantic boundary. The computer vision system can then identify semantic segments based upon a collection of semantic boundaries that are identified within a particular scene.

Accordingly, embodiments of a computer vision system disclosed herein accurately identify semantic boundaries within a scene that a user is viewing. As used herein, a semantic boundary is a visual boundary within a scene that is meaningful to a user. The location and/or presence of a semantic boundary may change based upon the user's interaction with a scene. For example, when a user is focused on a painting, the entire outline of the painting may comprise a semantic boundary. In contrast, if the user focuses on a particular individual depicted in the painting, the outline of the particular depicted individual comprises a semantic boundary. As such, the semantic boundary can change and adjust overtime based upon a user's focus. In a more general sense, a semantic boundary is also defined as a boundary within an image that defines a logically separate object. For example, a book shelf full of books may comprise multiple semantic boundaries that respectively define the book shelf and each separate book.

Embodiments of the computer vision system identify the specific object within the scene that is the center of the user's visual and mental focus. For example, using physiological readings from the user, the computer vision system is capable of determining whether the user is focusing on another individual, the individual's face, or even the individual's nose.

The ability to accurately segment objects within a scene provides significant benefits to many different fields, including, but not limited to, autonomous vehicles, robotic vision, virtual reality, and augmented reality. For instance, as will be disclosed more fully herein, an embodiment of the computer vision system is capable of distinguishing between a piece of paper on a table top and the tabletop itself. While this process of distinguishing between semantic objects may come naturally to human brains, a conventional computer vision system may struggle to determine whether the paper is a separate object from the tabletop or merely a painting or design within the tabletop itself.

Once semantic objects are correctly identified, the computer vision system is capable of classifying and labelling at least a portion of the semantic objects. For example, instead of labelling both the tabletop and paper as a single "table" entity, the computer vision system labels the paper as a single entity that is in contact with the table, which is also labelled as a single, separate entity.

In addition to being able to segment objects within a scene, embodiments of the disclosed computer vision system identify what a user is focusing on within a scene. For instance, as will be disclosed more fully herein, an embodiment of the computer vision system is capable of determining whether a user is focusing on a lamp, the lamp's shade, or a design on the body of the lamp.

Once the computer vision system correctly identifies the specific object that is the center of the user's focus, the computer vision system can properly interface with the user regarding the object. For example, the computer vision system may be configured to display information to a user relating to the object that the user is focusing on. The ability to determine whether the user is focusing on the lamp or the lamp shade ensures that the proper information is displayed to the user.

Turning now to the figures, FIG. 1 illustrates a schematic of an embodiment of various computer vision components within a computer vision system 100 in relation to a scene 150. In particular, FIG. 1 depicts a processing unit 110 in communication with a biometric tracking device 120 that is configured to gather physiological readings from the user and a gaze tracking device 130 that is configured to track a user's gaze. The depicted processing unit 110 comprises a stand-alone computer, but in additional or alternative embodiments, the processing unit 110 comprises an embedded processing device, a system-on-a-chip component, a FPGA, or any other processing device.

In various embodiments, the biometric tracking device 120 comprises one or more types of sensors that gather physiological readings from a user. For example, in at least one embodiment, the biometric tracking device 120 comprises one or more neurological sensors that monitor neurological activity from a user. The neurological sensors can comprise an electroencephalogram device ("EEG") that monitors electrical activity associated with the user's brain.

Other embodiments utilize neurological data gathered through other means, in addition to or alternative to EEG, such as magnetoencephalography (MEG), functional magnetic resonance imaging (fMRI), or other techniques for gathering context-based neurological data. In presently preferred embodiments, non-invasive EEG techniques are also used. It will be appreciated, however, that the scope of this disclosure also covers embodiments in which the described/claimed EEG sensor is replaced and/or supplemented with the MEG, fMRI and/or other context-based neurological data. In alternative or additional embodiments, the biometric tracking device 120 comprises one or more of a pulse-oximeter, skin galvanic response sensors, neurological implants, ultrasound sensors, blood pressure sensors, and any other biometric sensor capable of gathering physiological readings from a user. Any of the above described biometric tracking devices 212 may also be implemented as a sensor 290.

In various embodiments, the gaze tracking device 130 comprises eye tracking devices, eye-attached tracking, optical tracing, electric potential measurement, or any other technology capable of determining a gaze direction of a user. The gaze tracking device 130 can be embedded within a wearable device that the user wears, within a mounted device that tracks the user's gaze from the mounted position, or within a device that is otherwise mounted.

Optionally, in at least one embodiment, the computer vision system 100 also comprises an imaging device 140. The imaging device 140 receives an image of a digitally captured scene that corresponds with a field-of-view of the use. As depicted in FIG. 1, the user's field-of-view corresponds with scene 150. In various alternative or additional embodiments, the imaging device 140 comprises a video camera, a still-frame camera, a LIDAR, a depth camera, an ultra-violet camera, or any other device capable of capturing a visual image of a scene. Depending upon the type of device used, the imaging device 140 may be capable of gathering depth information about a scene.

In at least one embodiment, the computer vision system 100 is contained within a single device that includes the processing unit 110, the biometric tracking device 120, the gaze tracking device 130, and the imaging device 140. For example, the computer vision system 100 may be integrated into a wearable form-factor. As such, in at least one embodiment, the various components 110, 120, 130, 140 are enclosed within a single housing and share resources, such as power, structural support, and communication lines.

Figure 2:
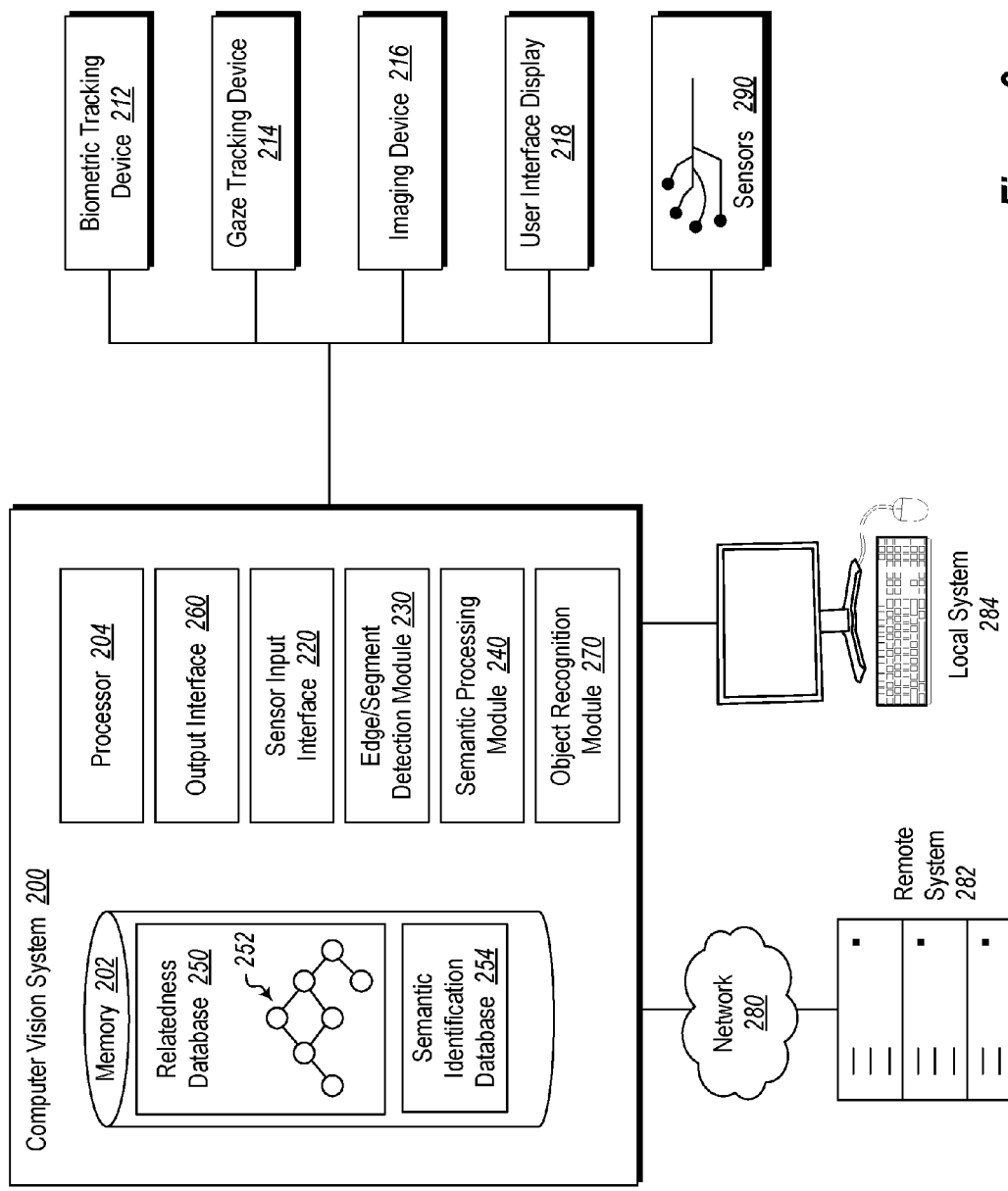
FIG. 2 illustrates a schematic of an embodiment of a computer vision system.

FIG. 2 illustrates a schematic of an embodiment of a computer vision system 200. The depicted embodiment comprises various exemplary modules representative of processes and functions of the processing unit 110. The computer vision system 200 comprises a processor 204 that receives computer-executable instructions that are operable, when executed by the processor 204, to implement a method for segmenting semantic components.

In various embodiments, the computer vision system 200 may be executed within a distributed system. For example, the computer vision system 200 may be executed both at a local system 284 and at a remote system 280. The local system 284 and the remote system 282 communicate through a network 280. In at least one embodiment, the local system 284 is wholly disposed within a wearable device and the remote system 282 is a cloud server that stores information and performs calculations for the computer vision system 200. While remote system 282 is depicted as a unitary server, in at least one embodiment, remote server 282 comprises geographically separate systems that communicate through network 280. One will understand that the depicted and described modules and structures of the computer vision system 200 are merely for the sake of clarity and do not limit the disclosed computer vision system 200 to any particular configuration.

The depicted input/output devices 212, 214, 216, 218, 290 communicate with the computer visions system 200. For example, the depicted input/output devices 212, 214, 216, 218, 290 include a biometric tracking device 212, a gaze tracking device 214, an imaging device 216, a user interface display 218, and various sensors 290. The various input/output devices 212, 214, 216, 218, 290 communicate with the computer visions system 200 through the sensor input interface 220 and the output interface 260. In at least one embodiment, the sensor input interface 220 and the output interface 260 comprise hardware interfaces that implement one or more different communication standards, including, but not limited to, universal serial bus (USB) standards, serial communication standards, parallel communication standards, BLUETOOTH communication standards, or Wi-Fi communication standards.

Using the information from the sensor input interface 220, the semantic processing module 240 identifies a differential within the physiological readings from the user. For example, the physiological readings may be generated by an EEG that is attached to the user. As used herein, a differential within the physiological readings comprises any detectable physiological change.

In at least one embodiment, the semantic processing module 240 executes a machine learning algorithm that has been trained to identify when the user has gazed at a semantic boundary based upon the user's physiological readings (e.g., EEG readings). For example, the machine learning algorithm may be trained by analyzing EEG readings from a large number of individuals who are asked to look from a first semantic object to a second semantic object. Because the location of the semantic boundary between the objects is known, the machine learning algorithm can be trained to identify a differential in the EEG readings of the users as their respective gazes cross the boundary. Using the output from the machine learning algorithm, the semantic processing module 240 identifies one or more differentials within the physiological readings that correspond to individual semantic boundaries associated with the user's gaze.

As the machine learning algorithm is trained, the machine learning algorithm stores data within a semantic identification database 254 that is located in memory 202. For example, in at least one embodiment, the data stored within a semantic identification database 254 comprises thresholds within the one or more differentials that identify semantic boundaries. For instance, the sound of a breaking glass may cause a differential response within a user that does not necessarily correspond with a visual semantic boundary. The data within a semantic identification database 254 comprises thresholds to distinguish between semantic boundaries and other differentials that do not necessarily correspond with a boundary. In at least one embodiment, the boundaries are identified by causing various stimulus to users while the machine learning algorithm is being trained.

In addition to determining that a user's gaze crossed a semantic boundary, the computer vision system 200 can also determine a relative location of the semantic boundary. For example, based upon data provided through the gaze tracking device 214, the semantic processing module 240 identities a relative location of the user's gaze at the time of the identified differential. The semantic processing module 240 then associates the relative location of the user's gaze with a semantic boundary. In an embodiment with an imaging device 216, the semantic processing module 240 associates the relative location of the semantic boundary with the relative location of the user's gaze within an image that was captured by the imaging device 216 at the same time that the differential was detected.

Additionally, in at least one embodiment, the imaging device 140 communicates image data to the computer vision system 200 through the sensor input interface 220. The edge/segment detection module 230 identifies edges or segments within the image of the scene 150. As used herein, edges correspond with visual lines within an image and may be identified using any number of different edge detection methods known in the art. Additionally, as used herein, a segment comprises a defined enclosed area of an image.

Within a given image, at least a portion of the detected edges form boundaries around segments. For example, a segment may comprise a super pixel and the boundary of the super pixel may comprise edges. As such, edges (or semantic boundaries as the case may be) segment at least two adjacent segments. For example, within the scene 150 of FIG. 1, the tabletop comprises edges that define the outer border of the tabletop. Additionally, the entire tabletop is a segment. In various embodiments, however, edges and segments can be otherwise determined such that the border of the tabletop comprises multiple distinct edges and the top of the tabletop comprises multiple distinct segments.

Returning to FIG. 2, when the semantic processing module 240 detects a differential within the physiological readings of the user, the semantic processing module 240 associates the relative location of the user's gaze with a particular edge that is nearest to the relative location of the user's gaze at the time of the identified differential. The semantic processing module 240 then associates the particular edge with a semantic boundary. As previously stated, an "edge" is a visually detectable line within an image. A semantic boundary is a boundary that the processing unit 110 detected through the combination of gaze tracking and differentials in the physiological readings. The semantic boundary may be associated with an edge, but does not necessarily need to be. For example, a semantic boundary can be created with just information regarding a user's gaze and differentials in the user's physiological readings—it is not necessary to map the semantic boundary to an edge or an image.

As various semantic edges and associated semantic segments, which are described more fully below, are identified, the semantic processing module 240 creates a relatedness data structure 252 that defines relatedness between different segments within the digitally captured scene. In at least one embodiment, the relatedness data structure 252 comprises at least a portion of a relational database that defines the probability of relatedness between different entries within the database. The semantic processing module 240 stores the relatedness data structure 252 within a relatedness database 250 within memory 202. As will be described more fully below, the relatedness data structures 252 define relationships between various objects within a scene.

Figure 3:
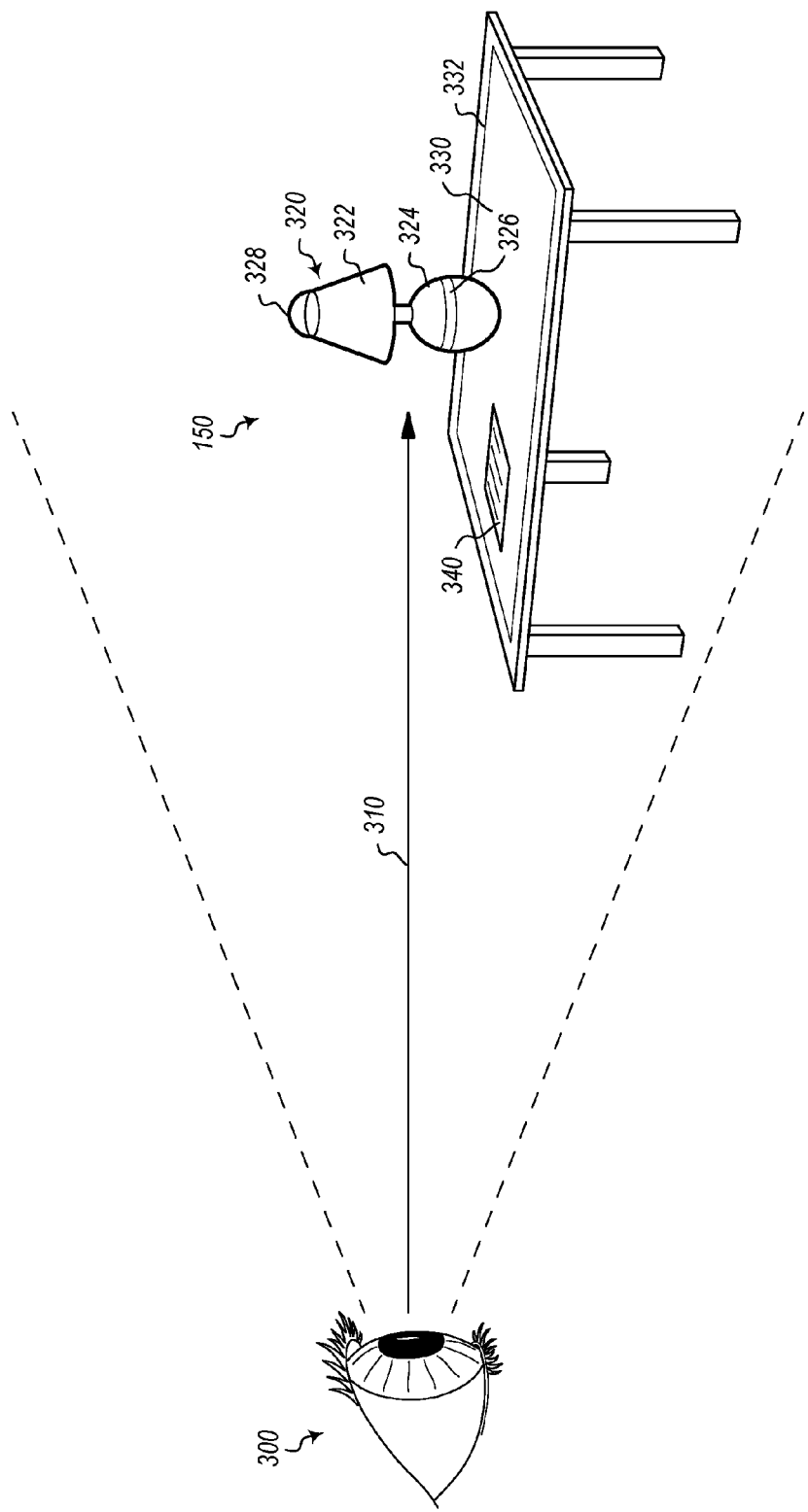
FIG. 3 illustrates a schematic of an embodiment of a user viewing a scene.

Turning now to an example, FIG. 3 illustrates a schematic of an embodiment of a user viewing a scene. The user's perspective 300 is depicted along with a gaze direction 310. As described above, the gaze direction is tracked by the computer vision system 100 using the gaze tracking device 130. The user is gazing at a scene 150 that includes a lamp 320, a table 330, and a paper 340. The lamp 320 comprises a base 324 with a design 326, a lamp shade 322, and a circular upper portion 328. The table comprises an etched border 332 that extends around an inner circumference of the tabletop. The paper 340 is resting flat on the table 330.

The user's gaze, in this case, is directed towards the lamp 320. In other cases, however, the user's gaze may be directed towards the base 324 of the lamp, the design 326 on the base 324, the lamp shade 322, the circular upper portion 328, the table 330, the etching 332 in the table 330, or the paper 340. Simply tracking the user's gaze is insufficient to determine the focus object that the user is focused on. For example, the user's gaze may be most precisely mapped to the lamp shade 322, however, the user may be more interested in the lamp itself. In contrast, the user's gaze could be directed towards the design 326 on the base 324, instead of the lamp 320 as a whole.

Identifying the focus object that the user it gazing at allows a computer vision system 100 to correctly display information to the user through the user interface display 218 (shown in FIG. 2). For example, the computer vision system 200 can determine that the user is seeking information regarding the lamp as a whole, and the computer vision system 200 can provide that information for display to the user interface display 218.

Figure 4:
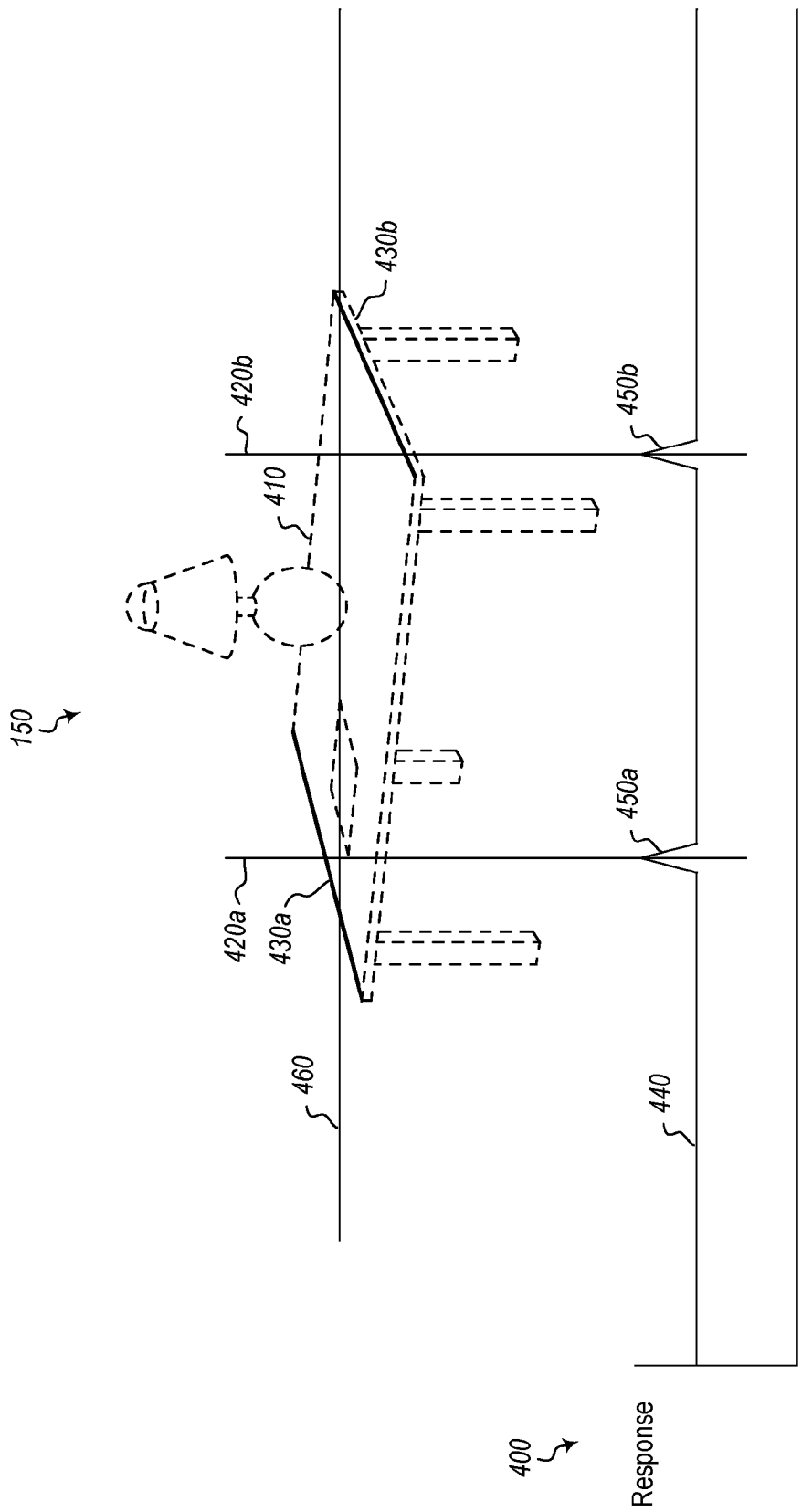
FIG. 4 illustrates a depiction of an embodiment of a user's gaze across a scene synced in time with an output from a machine learning algorithm.

FIG. 4 illustrates a depiction of an embodiment of a user's gaze across a scene 150 synced in time with an output 440 from a machine learning algorithm. In particular, FIG. 4 depicts the pathway 460 of a user's gaze across the scene. The depicted gaze pathway 460 is depicted as being straight for the sake of clarity and ease of description, one will understand that the pathway of a user's gaze will commonly be far more complex. For example, in at least one embodiment, the imaging device 140 comprises a depth camera and the gaze tracking device 130 tracks the relative depth of the location of the user's gaze. As such, the semantic boundary can also be created with respect to depth.

The scene 150 is depicted as being primarily composed of dashed lines. The dashed lines are used to indicate edges 410 that were detected by the edge/segment detection module 230 of FIG. 2. In an alternative or additional embodiment, the edge/segment detection module 230 may draw super pixels, or some other segmentation, onto the scene 150.

The output 440 from the machine learning algorithm depicts a symbolic graph 400 that indicates a response, where the response is a detected differential. In practice, the output of the machine learning algorithm may comprise a different form and complexity. The simplified depicted output 440 is provided for the sake of explanation and clarity. The depicted output 440 is also synced in time to the user's gaze 460, such that the output 440 indicates a differential that is synced in time to the location of the user's gaze 460.

As depicted, when the user's gaze reached the left edge of the table, the output 440 shows a detected differential response 450*a*. Similarly, when the user's gaze reached the right edge of the table, the output 400 shows a detected differential response 450*b*. Lines 420*a* and 420*b* are drawn to depict the alignment of the detected differential responses and the edges of the table.

As described above, the semantic processing module 240 identifies from the user's physiological readings a differential that indicates the user gazed at a semantic boundary. The semantic processing module 240 also receives data from the gaze tracking device 130 regarding the location of the user's gaze. Using this information, and optionally information from the imaging device 140, the semantic processing module 240 determines that the left edge of the table comprises a first semantic boundary 430*a* and the right edge of the table comprises a second semantic boundary 430*a*.

Figure 5:
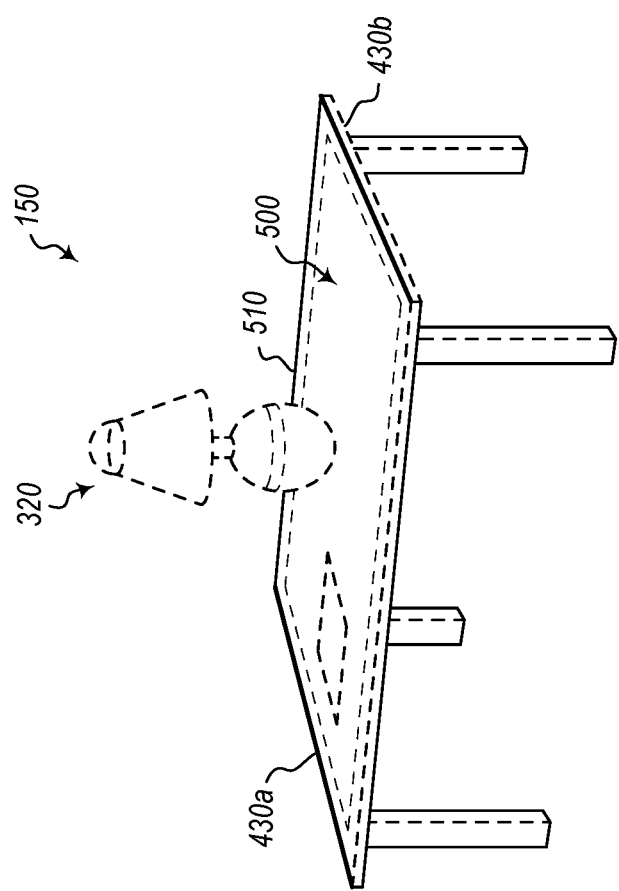

In at least one embodiment, the semantic processing module 240 then determines the focus object that the user is viewing. For example, FIG. 5 illustrates a schematic of an embodiment of an object that a user is focusing on. In particular, FIG. 5 depicts the table from the scene 150 of FIG. 4 that has been processed to identify a semantic segment 500 based upon the previously identified semantic boundaries 430a, 430b. The semantic processing module 240 extended the previously identified semantic boundaries 430a, 430b to adjacent edges in order to form a semantic segment 510.

In at least one embodiment, the semantic processing module 240 extends the semantic boundaries by identifying edges that are adjacent to the identified semantic boundaries 430a, 430b and that form a circuit. The semantic processing module 240 may favor extending the semantic boundaries to adjacent edges that comprise similar weights and/or intensities to the edges that are associated with the identified semantic boundaries 430a, 430b. As such, the semantic processing module 240 creates a semantic segment 500 that substantially encompasses the table—except for the portion relating to the lamp 320—based upon the particular edges that are associated with the identified semantic boundaries 430a, 430b.

Once the semantic processing module 240 identifies the semantic segment 500, the semantic processing module 240 communicates data relating to the semantic segment 500 to an object recognition module 270 (shown in FIG. 2). The object recognition module 270 then identifies the object based upon its visual appearance and labels the object as a table. In at least one embodiment, the object recognition module 270 also relies upon information stored within the semantic identification database 254 (shown in FIG. 2) when identifying objects. The semantic identification database 254 comprises data that assists in identifying semantic boundaries and in the identification of object types. For example, in at least one embodiment, a machine learning algorithm is trained to not only identify semantic boundaries based upon differentials in neurological readings, but also to identify the type of object that a user is viewing based upon the neurological readings themselves. The user interface display 218 then displays any necessary output relating to the table.

In at least one embodiment, the semantic processing module 240 identifies the focus object by determining the semantic segment that is associated with the most recently identified semantic boundary. For example, FIG. 6 illustrates a depiction of another embodiment of a user's gaze 610 across a scene 150 synced in time with an output 620 from a machine learning algorithm.

In the depicted embodiment, the semantic processing module 240 identifies differential responses 640a, 640b at the left and right edges of the paper 340. Lines 630a and 630b depict the alignment in time of the edges of the paper and the differential responses 640a, 640b. Based upon the differential responses 640a, 640b from the biometric tracking device 120 and the gaze tracking from the gaze tracking device 130, the semantic processing module 240 associates semantic boundaries 650a, 650b with the respective left and right edges of the paper 340. Using the processes described above, the semantic processing module 240 then creates a semantic segment that encompasses the paper.

Figure 6:
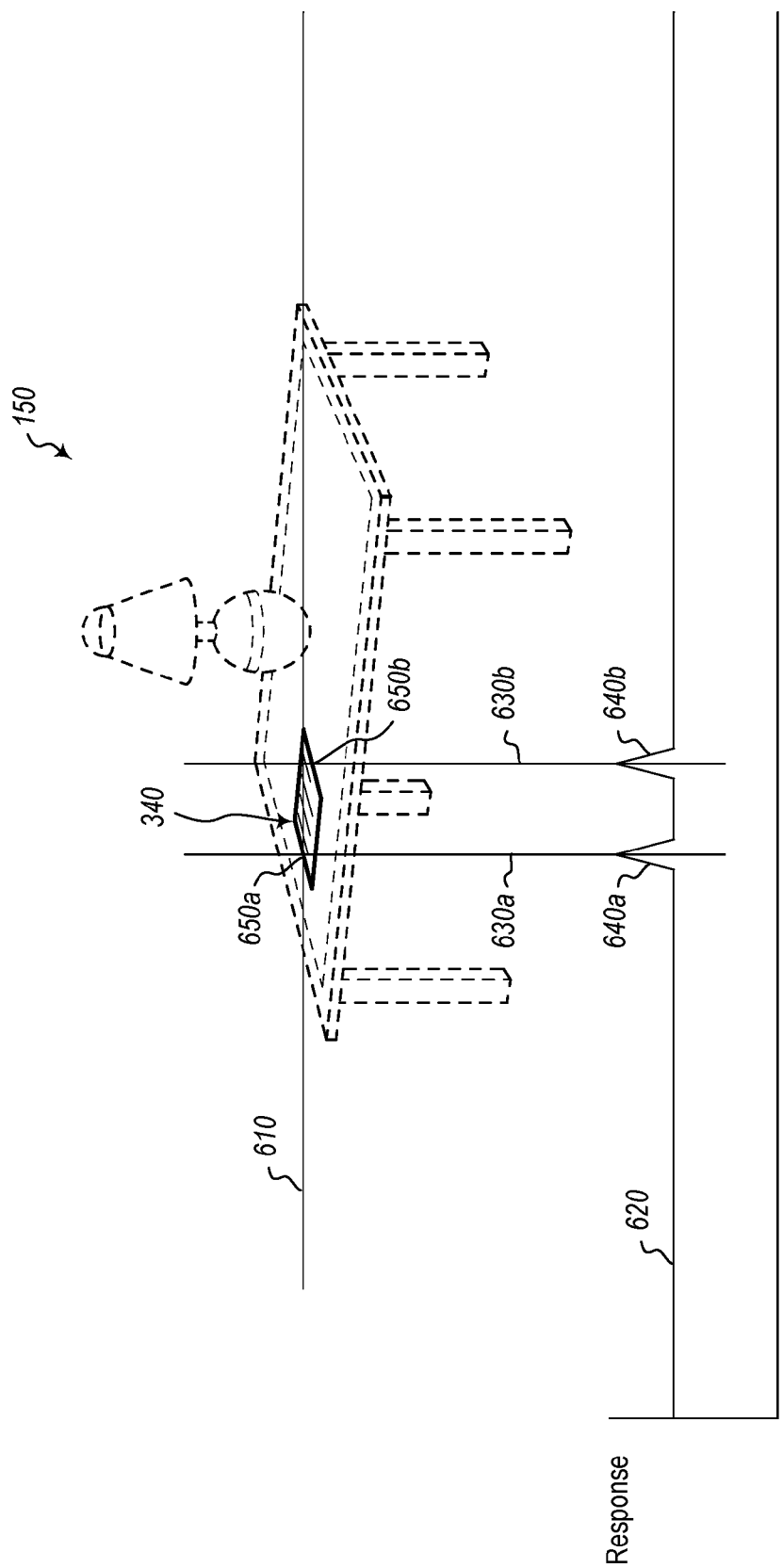
FIG. 6 illustrates a depiction of another embodiment of a user's gaze across a scene synced in time with an output from a machine learning algorithm.

Using FIGS. 5 and 6 as examples, when identifying the focus object, the semantic processing module 240 determines the semantic segment that is associated with the most recently identified semantic boundary. For example, when determining whether the focus object is the paper or the table, the semantic processing module 240 determines which semantic segment was most recently identified. If a semantic boundary associated with the paper was most recently identified, then the semantic processing module identifies the paper as the focus object. In contrast, if a semantic boundary associated with the table was most recently identified, then the semantic processing module identifies the table as the focus object. As used herein, a semantic boundary is "identified" every time a differential is detected. As such, a particular semantic boundary can be identified multiple times.

In addition to identifying the focus object, the semantic processing module 240 also determines a probability of relatedness between the adjacent segments based upon a relationship between the semantic boundaries segmenting the adjacent segments and other semantic boundaries that surround the adjacent segments. As applied to FIGS. 5 and 6, the semantic processing module 240 determines a probability of relatedness between the adjacent semantic segments of the table 500 and the paper 340. In other words, for example, the relatedness data structures define the relationship between the lamp 320, lamp base 324, lamp based design 326, lamp shade 322, and the circular upper portion 328.

The probability is based upon a relationship between the semantic boundaries 420a, 420b, 650a, 650b segmenting the adjacent segments and other semantic boundaries that surround the adjacent segments. In FIGS. 5 and 6, the semantic boundaries that define the paper 340 are completely surrounded by the semantic boundaries that define the table. The semantic processing module 240 can increase the probability of relationship every time it detects a differential response at both the table's edges and the paper's edges as the user's gaze sweeps across both. In contrast, the semantic processing module 240 can decrease the probability of relationship every time it detects a differential response at only one of the table's edges or the paper's edges as the user's gaze sweeps across both. As the semantic processing module 240 identifies increased or decreased probabilities of relatedness, the semantic processing module 240 creates a semantic relationship entry within the relatedness data structure in the relatedness database 250 that describes the probability of relatedness between the adjacent segments.

Figure 7:
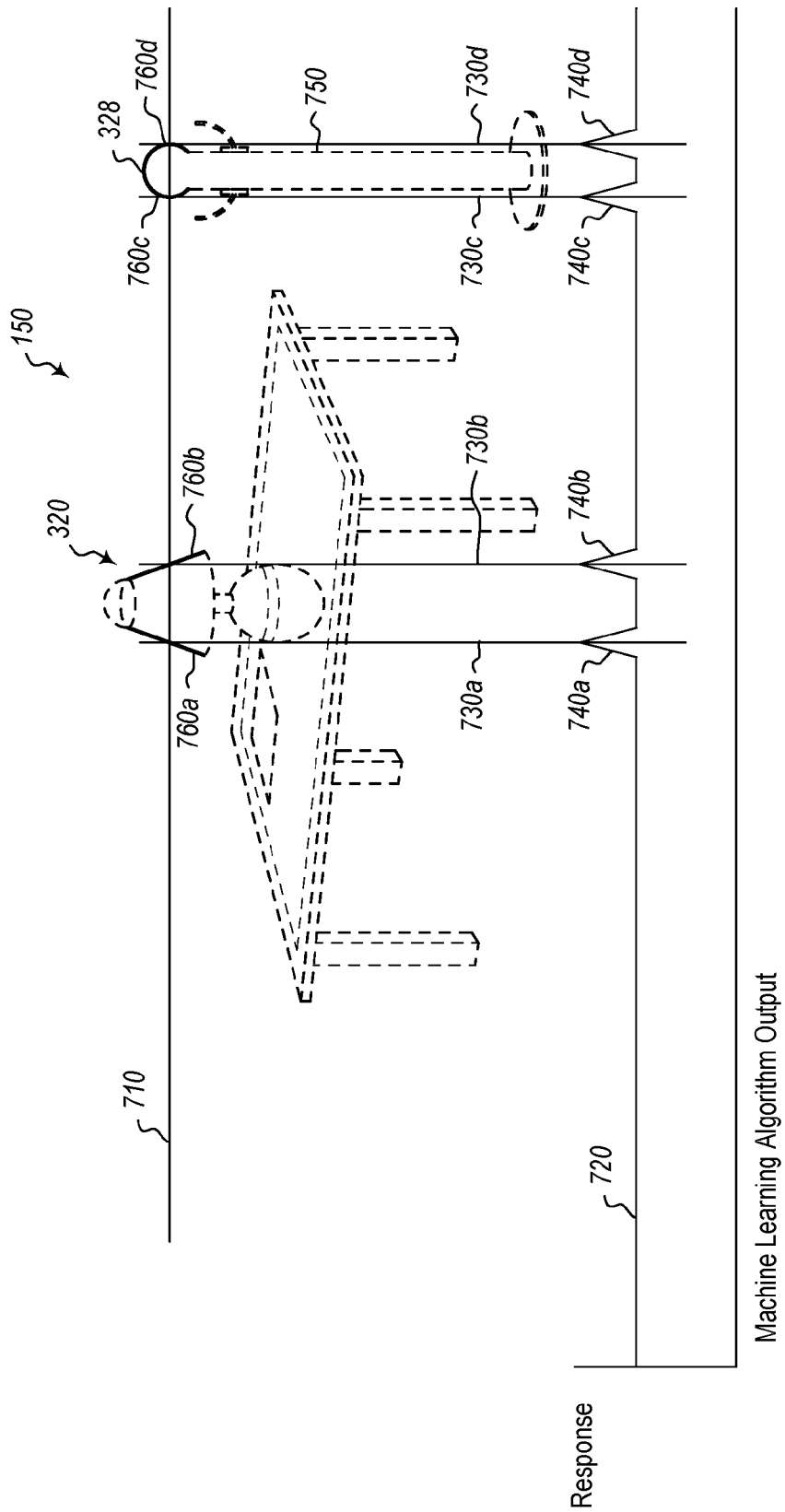
FIG. 7 illustrates a depiction of yet another embodiment of a user's gaze across a scene synced in time with an output from a machine learning algorithm.

FIG. 7 illustrates a depiction of yet another embodiment of a user's gaze 710 scanning across a scene 150 synced in time with an output from a machine learning algorithm 720. The scene 150 of FIG. 7 depicts the same scene as FIG. 6, but from a different perspective. In the depicted embodiment, the semantic processing module 240 identifies differential responses 740a, 740b, 740c, 740d at the left and right edges of the lamp shade 320 and the top of the coat rack 750. Lines 730a, 730b, 730c, 730d depict the alignment in time of the edges of the lamp shade 320 and the top of the coat rack 750 and the respective differential responses 740a, 740b, 740c, 740d.

Based upon the differential responses 740a, 740b, 740c, 740d from the biometric tracking device 120 and the gaze tracking from the gaze tracking device 130, the semantic processing module 240 associates semantic boundaries 760a, 760b, 760c, 760d with the respective left and right edges of lamp shade 320 and the top of the coat rack 750. The semantic processing module 240 identifies a semantic segment for the lamp shade 320 and a separate semantic segment for the top of the coat rack 750.

Because the user is in a different position and has a different view of the scene, it is now clear that what was previously identified as the circular upper portion 328 of the lamp 320 is actually not a part of the lamp 320, but instead is the top of the coat rack 750. Using the information from this new perspective of the scene 150, the semantic processing module 240 determines an updated probability of relatedness between the two segments (i.e., the lamp shade 320 and the top of the coat rack 750) within the second digitally captured scene based upon a relationship between the semantic boundaries segmenting the two segments and other semantic boundaries that surround the two segments. In the depicted case, the semantic processing module 240 determines that the probability that the lamp shade 320 and the top of the coat rack 750 are related is low. The semantic processing module 240 then updates a semantic relationship entry within the relatedness data structure that describes the probability of relatedness between the two segments.

Using the information stored within the relatedness data structure, the semantic processing module 240 is capable of identify semantic segments and the relationships between various semantic segments. For example, the semantic processing module 240 can identify that the coat rack 750 and the lamp 320 are separate objects. Additionally, based upon probability information stored within the relatedness data structure, the semantic processing module 240 identifies a semantic segment that is associated with the semantic boundary.

Turning to FIG. 7 as an example, upon identifying semantic boundaries 760*a* and 760*b*, the semantic processing module 240 can access various probabilities from the relatedness data structure. For instance, the relatedness data structure indicates that the semantic boundaries 760*a* and 760*b* have a high probability of being related to the lamp shade 320 and/or the lamp as-a-whole. The semantic processing module 240 may determine that the highest probability is that the semantic boundaries 760*a*, 760*b* are related to the semantic segment that represents the lamp shade 320.

As described above, in at least one embodiment, the relatedness data structure assists the semantic processing module 240 in identifying semantic segments. For example, the lamp shade 320 of FIG. 5 comprises multiple edges extending across vertical length of the lamp shade 320. The multiple edges may comprise folds in the lamp shade, lines on the lamp shade, or merely comprise visual artifacts. In any case, the semantic segment of the lamp shade 320 may comprise a plurality of segments that may or may not be semantic. For instance, the lines on the lamp shade are not part of any semantic segments; however, the design 326 on the lamp base 324 may comprise a sub-semantic segment of the lamp base 324. A sub-semantic segment is a semantic segment that is completely encompassed by, and highly related to, another semantic segment. When a user gazes at the sub-semantic segment, the semantic processing module 240 determines whether focus object is the sub-semantic segment or the encompassing semantic segment based upon the information within the relatedness data structure.

One will appreciate that embodiments disclosed herein can also be described in terms of flowcharts comprising one or more acts for accomplishing a particular result. For example, FIG. 8 and the corresponding text describe acts in various systems for performing methods and/or stand-alone methods for segmenting scenes into semantic components. The acts of FIG. 8 are described below.

Figure 8:
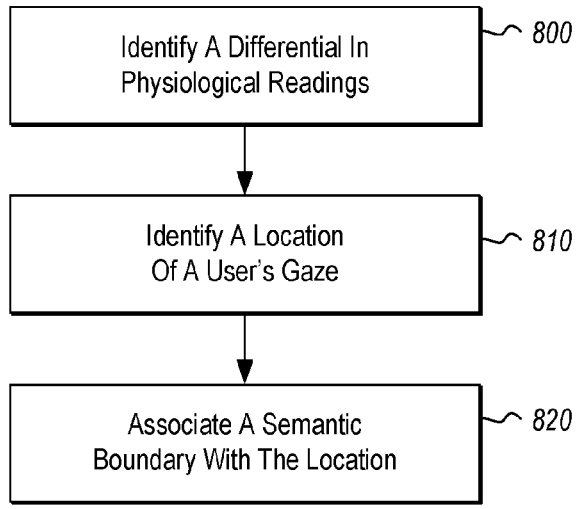
FIG. 8 illustrates a flowchart for an embodiment of a method for segmenting scenes into semantic components with a computer vision system.

For example, FIG. 8 illustrates that a flowchart for an embodiment of a method for segmenting scenes into semantic components with a computer vision system comprises an act 800 of identifying a differential in physiological readings. Act 800 includes identifying a differential within physiological readings from the user, wherein the differential corresponds to a semantic boundary associated with the user's gaze. For example, as depicted and described in FIGS. 4, 6, and 7 and the accompanying description, the semantic processing module 240 identifies a differential using the output of a machine learning algorithm.

Additionally, FIG. 8 illustrates that the method includes an act 810 of identifying a location of a user's gaze. Act 810 comprises based upon data gathered by the gaze tracking device, identifying a relative location of the user's gaze at the time of the identified differential. For example, as depicted and described in FIGS. 1 and 2 and the accompanying description, the computer vision system 100, 200 comprises a gaze tracking device 130 that is in communication with a gaze tracking device 214 within the computer vision tracking system 200. The gaze tracking device 214, using the methods described above, or any other conventional method, identifies the relative location of the user's gaze and communicates that information to the gaze tracking device 214.

FIG. 8 also illustrates that the method includes an act 820 of associating a semantic boundary with the location. Act 820 comprises associating the relative location of the user's gaze with a semantic boundary. For example, as depicted and described in FIGS. 4, 6, and 7 and the accompanying description, the semantic processing module 240 associates semantic boundaries 420*a*, 420*b*, 650*a*, 650*b*, 760*a*, 760*b*, 760*c*, 760*d* with the location of the user's gaze at the time that the differential was detected.

One will appreciate that embodiments disclosed herein can also be described in terms of alternative or additional flowcharts comprising one or more acts for accomplishing a particular result. For example, FIG. 9 and the corresponding text describe acts in various systems for performing methods and/or stand-alone methods for segmenting scenes into semantic components. The acts of FIG. 9 are described below.

Figure 9:
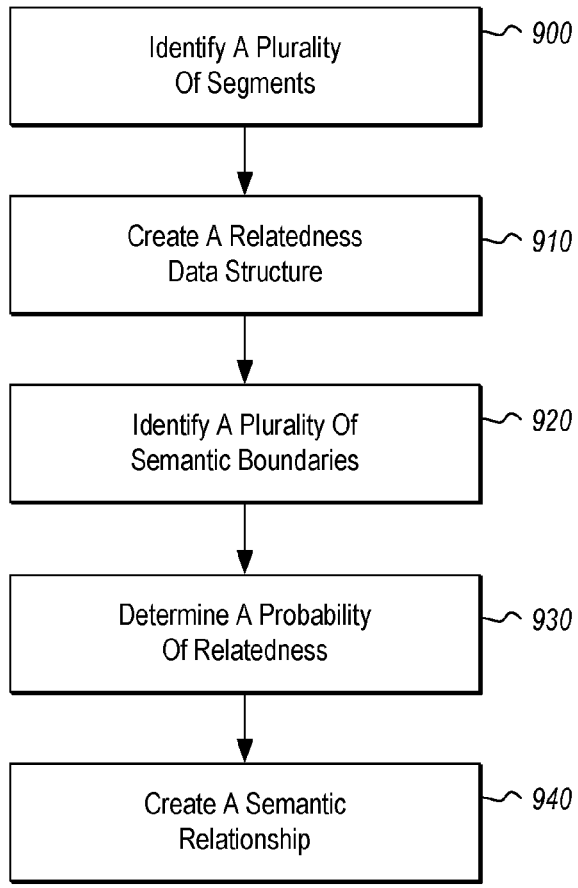
FIG. 9 illustrates a flowchart for another embodiment of a method for segmenting scenes into semantic components with a computer vision system.

For example, FIG. 9 illustrates that a flowchart for another embodiment of a method for segmenting scenes into semantic components with a computer vision system can include an act 900 of identifying a plurality of segments. Act 900 comprises identifying a plurality of segments within a first digitally captured scene. For example, as depicted and described in FIGS. 2, 4, 6, and 7 and the accompanying description, the edge/segmentation detection module 230 can detect edges and/or segments within a received digital image of a scene. The detected edges may comprise visually identifiable lines, and the segments may comprise enclosed space within the image—for example, as enclosed by super pixels.

Additionally, FIG. 9 illustrates that the method includes an act 910 of creating a relatedness data structure. Act 910 comprises creating a relatedness data structure that defines relatedness between different segments within the digitally captured scene, wherein the segments are at least partially defined by one or more edges. For example, as depicted and described in FIG. 2 and the accompanying description, the semantic processing module 240 can create a relational database that stores the information of the relatedness data structure.

FIG. 9 also illustrates that the method includes an act 920 of identifying a plurality of semantic boundaries. Act 920 comprises identifying a plurality of semantic boundaries between the plurality of segments in the first digitally captured scene, each of the semantic boundaries segmenting at least two adjacent segments, wherein each of the semantic boundaries are identified based upon a differential within physiological readings from a user while the user is gazing at one of the one or more edges. For example, as depicted and described in FIGS. 4, 6, and 7 and the accompanying description, the semantic processing module 240 identifies semantic boundaries 420*a*, 420*b*, 650*a*, 650*b*, 760*a*, 760*b*, 760*c*, 760*d* at the location of the user's gaze at the time that the differential was detected.

Further, FIG. 9 illustrates that the method includes an act 930 of determining a probability of relatedness. Act 930 comprises determining a probability of relatedness between the adjacent segments based upon a relationship between the semantic boundaries segmenting the adjacent segments and other semantic boundaries that surround the adjacent segments. For example, as depicted and described in FIG. 7 and the accompanying description, the semantic processing module 240 calculates a probability of relatedness between the two segments (i.e., the lamp shade 320 and the top of the coat rack 750) within the scene based upon a relationship between the semantic boundaries segmenting the two segments and other semantic boundaries that surround the two segments. In the depicted case, the semantic processing module 240 determines that the probability that the lamp shade 320 and the top of the coat rack 750 are related is low because, from the view of FIG. 7, it is clear that the semantic boundaries of the lamp 760*a*, 760*b* and the semantic boundaries of the top of the coat rack 760*c*, 760*d* are separate by a large distance. As such, the semantic processing unit 240 determines that there is a low probability of relatedness between the semantic boundaries segmenting the adjacent segments and other semantic boundaries that surround the adjacent segments.

Further still, FIG. 9 illustrates that the method includes an act 940 of creating a semantic relationship. Act 940 comprises creating a semantic relationship entry within the relatedness data structure that describes the probability of relatedness between the adjacent segments. For example, as depicted and described in FIG. 7 and the accompanying description, the semantic processing module 240 creates/updates a semantic relationship entry within the relatedness data structure that describes the probability of relatedness between the lamp shade 320 and the top of the coat rack 750.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer vision system for segmenting scenes into semantic components, comprising:
    a processing unit in communication with a biometric tracking device that is configured to gather physiological readings from the user and a gaze tracking device that is configured to track a user's gaze; and
    one or more tangible storage media having stored thereon computer-executable instructions that are operable, when executed by the processing unit, to implement a method for segmenting semantic components by at least causing the processing unit to:
        identify a differential within the physiological readings from the user, wherein the differential corresponds to a semantic boundary associated with the user's gaze, based upon data gathered by the gaze tracking device, identify a relative location of the user's gaze at the time of the identified differential, and
        associate the relative location of the user's gaze with a semantic boundary.

2. The computer vision system as recited in claim 1, wherein the physiological readings are from an electroencephalogram device that is receiving readings from the user.

3. The computer vision system as recited in claim 1, wherein computer-executable instructions are further operable, when executed by the processing unit, to:
    receive, from an imaging device, an image that corresponds with a field-of-view of the use; and
    identify edges within the image, wherein the edges correspond with visual boundaries within the image.

4. The computer vision system as recited in claim 3, wherein the imaging device comprises a depth camera and the image comprise depth information.

5. The computer vision system as recited in claim 3, wherein at least a portion of the edges form boundaries around segments within the image.

6. The computer vision system as recited in claim 5, wherein the segments at least partially outline objects within the scene.

7. The computer vision system as recited in claim 5, wherein computer-executable instructions are further operable, when executed by the processing unit, to:
    associate the relative location of the user's gaze with a particular edge that is nearest to the relative location of the user's gaze at the time of the identified differential; and
    associate the particular edge with a semantic boundary.

8. The computer vision system as recited in claim 7, wherein computer-executable instructions are further operable, when executed by the processing unit, to identify a segment that includes the particular edge as a semantic segment.

9. The computer vision system as recited in claim 7, wherein identifying a differential within the physiological readings from the user, comprises:
    providing the physiological readings from the user to a machine learning algorithm, wherein the machine learning algorithm has been trained to identify when the user has gazed at a semantic boundary based upon the user's physiological readings.

10. A computer vision system for defining semantic relationships between segments within a scene, comprising:
    one or more processors; and one or more tangible computer-readable media having stored thereon executable instructions that when executed by the one or more processors configure the computer system to perform at least the following:
        identify a plurality of segments within a first digitally captured scene;
        create a relatedness data structure that defines relatedness between different segments within the digitally captured scene, wherein the segments are at least partially defined by one or more edges;
        identify a plurality of semantic boundaries between the plurality of segments in the first digitally captured scene, each of the semantic boundaries segmenting at least two adjacent segments, wherein each of the semantic boundaries are identified based upon a differential within physiological readings from a user while the user is gazing at one of the one or more edges;
        determine a probability of relatedness between the adjacent segments based upon a relationship between the semantic boundaries segmenting the adjacent segments and other semantic boundaries that surround the adjacent segments; and create a semantic relationship entry within the relatedness data structure that describes the probability of relatedness between the adjacent segments.

11. The computer vision system as recited in claim 10, wherein the one or more computer-readable media also have stored thereon instructions that when executed configure the computer system to:
identify a focus object within the digitally captured scene, wherein the focus object comprises a semantic segment upon which the user most recently gazed.

12. The computer vision system as recited in claim 11, wherein identifying the focus object comprises:
identifying the most recently identified semantic boundary; and
based upon probability information stored within the relatedness data structure, identifying a semantic segment that is associated with the semantic boundary.

13. The computer vision system as recited in claim 12, wherein the semantic segment comprises a plurality of segments.

14. The computer vision system as recited in claim 13, wherein at least one of the plurality of segments comprises a non-semantic segment.

15. The computer vision system as recited in claim 13, wherein at least one of the plurality of segments comprises a sub-semantic segment.

16. The computer vision system as recited in claim 11, wherein the one or more computer-readable media also have stored thereon instructions that when executed configure the computer system to:
analyze the semantic segment with an object recognition module, wherein the object recognition module is configured to identify the object based upon its visual appearance.

17. The computer vision system as recited in claim 10, wherein the one or more computer-readable media also have stored thereon instructions that when executed configure the computer system to:
identify a plurality of segments within a second digitally captured scene, wherein the second digitally captured scene comprises a different perspective of the first digitally captured scene;
based upon the different perspective, determine an updated probability of relatedness between two segments within the second digitally captured scene based upon a relationship between the semantic boundaries segmenting the two segments and other semantic boundaries that surround the two segments; and
update a semantic relationship entry within the relatedness data structure that describes the probability of relatedness between the two segments.

18. The computer vision system as recited in claim 17, wherein updating a semantic relationship entry within the relatedness data structure comprises decreasing the probability that the two segments are related.

19. The computer vision system as recited in claim 11, wherein the physiological readings are from an electroencephalogram device that is receiving readings from the user.

20. A computer-implemented method for segmenting scenes into semantic components with a computer vision system:
identifying a differential within detected physiological readings from a user, the detected physiological readings being obtained from a biometric tracking device, wherein the differential corresponds to a semantic boundary associated with a user's gaze, the user's gaze being detected from a gaze tracking device,
based upon data gathered by the gaze tracking device, identifying a relative location of the user's gaze at a time of the identified differential, and
associating the relative location of the user's gaze with the semantic boundary.

* * * * *